United States Patent
Krawinkel et al.

(10) Patent No.: US 11,084,958 B2
(45) Date of Patent: Aug. 10, 2021

(54) DETACHABLE ADHESIVE STRIP

(71) Applicant: TESA SE, Hamburg (DE)

(72) Inventors: Thorsten Krawinkel, Hamburg (DE); Lesmona Scherf, Hamburg (DE); Anika Petersen, Bimöhlen (DE); Thilo Dollase, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 14/653,498

(22) PCT Filed: Dec. 5, 2013

(86) PCT No.: PCT/EP2013/075621
§ 371 (c)(1),
(2) Date: Jun. 18, 2015

(87) PCT Pub. No.: WO2014/095382
PCT Pub. Date: Jun. 26, 2014

(65) Prior Publication Data
US 2015/0337177 A1    Nov. 26, 2015

(30) Foreign Application Priority Data

Dec. 19, 2012 (DE) .................... 10 2012 223 670.8

(51) Int. Cl.
*C09J 153/02* (2006.01)
*C09J 7/22* (2018.01)
(Continued)

(52) U.S. Cl.
CPC .............. *C09J 153/02* (2013.01); *C09J 7/22* (2018.01); *C09J 7/25* (2018.01); *C09J 7/38* (2018.01);
(Continued)

(58) Field of Classification Search
None
See application file for complete search history.

(56) References Cited

U.S. PATENT DOCUMENTS

| 4,024,312 A | 5/1977 | Korpman |
| 5,409,189 A | 4/1995 | Lühmann |

(Continued)

FOREIGN PATENT DOCUMENTS

| DE | 27 28 346 A1 | 1/1978 |
| DE | 33 31 016 A1 | 10/1984 |

(Continued)

OTHER PUBLICATIONS

REGALREZ 1018 data sheet (2018).*
(Continued)

*Primary Examiner* — Frank D Ducheneaux
(74) *Attorney, Agent, or Firm* — Norris McLaughlin, P.A.

(57) ABSTRACT

The invention relates to an adhesive film strip comprising at least two, particularly three, layers, which adhesive film strip can be detached without residues and nondestructively by expansive stretching substantially in the adhesion plane, with a carrier on which a first external adhesive compound layer is present on at least one side, wherein • the adhesive compound layer consists of adhesive compound formed on the basis of vinyl aromatic block copolymers and adhesive resins, wherein at least 75% of the resin (relative to the overall resin content) is selected with a DACP (diacetone alcohol cloud point) of greater than −20° C., preferably greater than 0° C., and • the carrier has at least one layer consisting of a polyurethane with an elongation at break of at least 100% and a restoring power of more than 50%. A nonpolar hydrocarbon resin or a polyterpene resin is particularly used as the tackifier for the adhesive compound(s).

14 Claims, 2 Drawing Sheets

(51) Int. Cl.
    *C09J 7/38*     (2018.01)
    *C09J 7/25*     (2018.01)
    *C08K 5/01*     (2006.01)

(52) U.S. Cl.
    CPC ............ *C09J 7/381* (2018.01); *C08K 5/01* (2013.01); *C09J 2301/124* (2020.08); *C09J 2301/308* (2020.08); *C09J 2301/408* (2020.08); *C09J 2453/00* (2013.01); *C09J 2475/006* (2013.01); *Y10T 428/2848* (2015.01); *Y10T 428/2861* (2015.01); *Y10T 428/2878* (2015.01)

(56) References Cited

U.S. PATENT DOCUMENTS

| | | | |
|---|---|---|---|
| 5,491,012 A | 2/1996 | Lühmann | |
| 5,507,464 A | 4/1996 | Hamerski et al. | |
| 5,626,931 A | 5/1997 | Lühmann | |
| 5,626,932 A | 5/1997 | Lühmann | |
| 5,672,402 A | 9/1997 | Kreckel et al. | |
| 5,846,276 A | 12/1998 | Nagai et al. | |
| 5,897,949 A | 4/1999 | Lühmann et al. | |
| 5,925,459 A | 7/1999 | Zimmermann et al. | |
| 5,967,474 A | 10/1999 | Docanto et al. | |
| 6,001,471 A * | 12/1999 | Bries | A47G 1/175 248/205.3 |
| 6,004,665 A | 12/1999 | Lühmann et al. | |
| 6,153,718 A * | 11/2000 | Imashiro | C08G 18/025 528/67 |
| 6,245,177 B1 | 6/2001 | Lühmann | |
| 6,280,840 B1 | 8/2001 | Lühmann et al. | |
| 6,284,378 B1 | 9/2001 | Junghans et al. | |
| 6,342,720 B1 | 1/2002 | Presting et al. | |
| 6,372,335 B1 | 4/2002 | Lühmann et al. | |
| 6,395,389 B1 | 5/2002 | Lühmann et al. | |
| 6,402,875 B1 | 6/2002 | Lühmann et al. | |
| 6,503,621 B1 * | 1/2003 | Ma | C09J 133/06 428/355 AC |
| 6,544,639 B1 | 4/2003 | Lühmann et al. | |
| 6,641,892 B2 | 11/2003 | Lühmann | |
| 6,680,096 B1 | 1/2004 | Lühmann et al. | |
| 6,874,740 B1 | 4/2005 | Leiber et al. | |
| 7,101,615 B2 | 9/2006 | Lühmann et al. | |
| 7,264,870 B2 | 9/2007 | Lühmann et al. | |
| 7,645,507 B2 | 1/2010 | Vermunicht et al. | |
| 2002/0017359 A1 | 2/2002 | Lühmann | |
| 2002/0034628 A1 | 3/2002 | Lühmann et al. | |
| 2002/0051875 A1 | 5/2002 | Lühmann et al. | |
| 2002/0197470 A1 | 12/2002 | Krawinkel | |
| 2003/0070579 A1 * | 4/2003 | Hong | C09J 7/0264 106/31.04 |
| 2005/0176872 A1 * | 8/2005 | Martin | C09J 5/02 524/515 |
| 2007/0092722 A1 | 4/2007 | Vermunicht et al. | |
| 2010/0148127 A1 * | 6/2010 | Ellinger | C09J 123/142 252/500 |
| 2015/0166779 A1 * | 6/2015 | Diehl | C08L 23/16 524/528 |

FOREIGN PATENT DOCUMENTS

| | | | |
|---|---|---|---|
| DE | 42 22 849 C1 | 6/1993 | |
| DE | 42 33 872 A1 | 3/1994 | |
| DE | 44 28 587 A1 | 2/1996 | |
| DE | 44 31 914 A1 | 3/1996 | |
| DE | 195 11 288 A1 | 10/1996 | |
| DE | 19626375 A1 | 1/1997 | |
| DE | 196 21 469 A1 | 2/1997 | |
| DE | 195 31 696 A1 | 3/1997 | |
| DE | 296 23 112 U1 | 10/1997 | |
| DE | 197 08 366 A1 | 1/1998 | |
| DE | 19708366 A1 | 1/1998 | |
| DE | 196 49 636 A1 | 6/1998 | |
| DE | 196 49 727 A1 | 6/1998 | |
| DE | 196 49 728 A1 | 6/1998 | |
| DE | 196 49 729 A1 | 6/1998 | |
| DE | 197 08 364 A1 | 9/1998 | |
| DE | 197 20 145 A1 | 11/1998 | |
| DE | 197 23 177 A1 | 12/1998 | |
| DE | 197 23 198 A1 | 12/1998 | |
| DE | 19813081 A1 | 1/1999 | |
| DE | 197 56 816 C1 | 2/1999 | |
| DE | 197 56 084 A1 | 7/1999 | |
| DE | 198 20 858 A1 | 11/1999 | |
| DE | 198 42 864 A1 | 3/2000 | |
| DE | 198 42 865 A1 | 3/2000 | |
| DE | 199 38 693 A1 | 2/2001 | |
| DE | 100 03 318 A1 | 8/2001 | |
| DE | 10 2007 034 474 A1 | 1/2009 | |
| EP | 748829 A1 * | 12/1996 | ............ C08G 18/66 |
| EP | 0816458 A2 | 1/1998 | |
| EP | 1 363 681 B1 | 5/2006 | |
| JP | H 06 504077 A | 5/1994 | |
| JP | H 06 346032 A | 12/1994 | |
| JP | 2003 041217 A | 2/2003 | |
| JP | 2004 162064 A | 6/2004 | |
| JP | 2009 520042 A | 5/2009 | |
| TW | 215105 | 10/1993 | |
| WO | 92/11332 A1 | 7/1992 | |
| WO | 92/11333 A1 | 7/1992 | |
| WO | 94/21157 A1 | 9/1994 | |
| WO | 95/06691 A1 | 3/1995 | |
| WO | 97/07172 A1 | 2/1997 | |
| WO | 98/03601 A1 | 1/1998 | |
| WO | 99/31193 A1 | 6/1999 | |
| WO | 99/37729 A1 | 7/1999 | |
| WO | 99/63018 A1 | 12/1999 | |
| WO | 00/12644 A1 | 3/2000 | |
| WO | 00/13888 A1 | 3/2000 | |
| WO | 2010/141248 A1 | 12/2010 | |

OTHER PUBLICATIONS

Zimmermann (machine translation of German Patent Application Publication No. 33 31 016 C2, published Jul. 16, 1992).

Merriam-Webster Dictionary Definition (https://www.merriam-webster.com/dictionary/congruently (2019)).

* cited by examiner

DETACHABLE ADHESIVE STRIP

This application is a 371 of International Patent Application No. PCT/EP2013/075621, filed Dec. 5, 2013, which claims foreign priority benefit under 35 U.S.C. § 119 of German Patent Application No. 10 2012 223 670.8, filed Dec. 19, 2012, the disclosures of which patent applications are incorporated herein by reference.

The invention relates to a tear-resistant pressure-sensitive adhesive strip based on styrene block copolymers which can be used to produce a bond which can be detached again by expansive stretching in the direction of the adhesion plane.

Elastically or plastically highly extensible self-adhesive tapes which can be detached again without leaving a residue and without causing damage by expansive stretching in the adhesion plane are known, for example, from U.S. Pat. No. 4,024,312 A, DE 33 31 016 C2, WO 92/11332 A1, WO 92/11333 A1, DE 42 22 849 C1, WO 95/06691 A1, DE 195 31 696 A1, DE 196 26 870 A1, DE 196 49 727 A1, DE 196 49 728 A1, DE 196 49 729 A1, DE 197 364 A1, DE 197 20 145 A1, DE 198 20 858 A1, WO 99/37729 A1 and DE 100 03 318 A1 and are referred to hereinbelow also as strippable self-adhesive tapes.

Such strippable self-adhesive tapes are frequently used in the form of adhesive film strips which are pressure-sensitively adhesive on one side or on both sides and which preferably have a grip region that is not pressure-sensitively adhesive, from which the detachment process is initiated. Particular applications of corresponding self-adhesive tapes are to be found inter alia in DE 42 33 872 C1, DE 195 11 288 C1, U.S. Pat. No. 5,507,464 B1, U.S. Pat. No. 5,672,402 B1 and WO 94/21157 A1. Special forms are also described in DE 44 28 587 C1, DE 44 31 914 C1, WO 97/07172 A1, DE 196 27 400 A1, WO 98/03601 A1 and DE 196 49 636 A1, DE 197 20 526 A1, DE 197 23 177 A1, DE 197 23 198 A1, DE 197 26 375 A1, DE 197 56 084 C1, DE 197 56 816 A1, DE 198 42 864 A1, DE 198 42 865 A1, WO 99/31193 A1, WO 99/37729 A1, WO 99/63018 A1, WO 00/12644 A1 and DE 199 38 693 A1.

Preferred fields of use of the above-mentioned strippable adhesive film strips include in particular the fixing of light-weight to medium-weight objects in the residential, work and office sector in such a manner that the fixing can be detached again without leaving a residue and without causing damage. For use in the residential and office sector, very thick products of over 400 µm are generally used.

In the consumer electronics industry—such as, for example, in the production of mobile telephones, digital cameras or laptops—there is a growing desire for a possibility of separating the individual components upon disposal after they have been used. Some components can then be reused or recycled. Or at least separate disposal is possible. Detachable adhesive bonds are therefore of great interest in that industry. In particular adhesive tapes which have a high holding power and can easily be removed as desired here form an expedient alternative to adhesive strips which must first be pretreated, for example by being heated, in order to be detached.

In the consumer electronics sector, preference is given to adhesive strips which are as thin as possible, because the end devices are to be as thin as possible and therefore all the individual components are also to occupy little space.

When very thin strippable adhesive strips without carriers are used, there is increased tearing (see DE 33 31 016 C2). If the adhesive strips tear, however, it is generally no longer possible to detach them, because the remainder of the adhesive strip springs back into the joint and thus no grip tab is available.

WO 92/11333 A1 describes a strippable adhesive tape which uses as carrier a highly stretchable film which, after stretching, has a resilience of <50% and thus is not rubber-elastic.

Elastic carrier layers are disclosed, for example, in DE 197 08 366 A1 or DE 27 28 346 A1. In both cases, the carrier layer consists of a material similar to that of the adhesive layers, preferably of styrene block copolymers. The similarity between the carrier layer and the adhesive layers has the disadvantage, as is also described occasionally in the specifications, that the resins used are also readily able to migrate into the carrier layer. It is therefore necessary to use similar or the same resins in the carrier and in the adhesive outer layers, or to include a separating layer. Migration of the resin can lead in particular to a depletion of the resins in the adhesive layer after a prolonged time, as a result of which the adhesive layer has less bonding power or even no longer appears pressure-sensitively adhesive at all.

WO 92/11332 A1 describes an adhesive film strip which can be detached again by pulling in the adhesion plane and for which a highly stretchable, substantially non-resilient film can be used as carrier. As adhesive compositions there are used only UV-crosslinked acrylate polymers, with which the high bond strengths cannot be achieved and which lose less adhesive force during elongation than is the case, for example, with adhesive compositions based on vinyl aromatic block copolymers.

Further publications, such as WO 2010/141248 A1, describe systems with polyisobutylene pressure-sensitive adhesive compositions, which likewise exhibit a low adhesive power.

A strippable adhesive film strip having a foamed film carrier which is not pressure-sensitively adhesive is described in WO 95/06691 A1, DE 196 49 727 A1, DE 196 49 728 A1, DE 196 49 729 A1 and DE 198 20 858 A1. A small thickness of the adhesive film strip of less than 200 µm is, however, not possible because of the intermediate foam carrier.

The object of the invention is to find an adhesive strip which is detachable by stretching in the direction of the adhesion plane and comprises an adhesive composition based on vinyl aromatic block copolymers and a carrier which is highly extensible and for the large part elastic, and in which none of the resins used in the adhesive layer migrate from the adhesive layer.

The object is achieved according to the invention by a pressure-sensitive adhesive film strip of the generic type, as is specified in the main claim. The dependent claims provide advantageous further developments of the pressure-sensitive adhesive film strip.

Accordingly, the invention relates to a pressure-sensitive adhesive film strip comprising at least two, in particular three, layers, which can be detached again without leaving a residue and without causing damage by expansive stretching substantially in the adhesion plane, having a carrier on which a first, outer adhesive composition layer is present on at least one side, wherein the adhesive composition layer consists of an adhesive composition based on vinyl aromatic block copolymers and adhesive resins, wherein at least 75% (based on the total resin content) of the resin is chosen with a DACP (diacetone alcohol cloud point) of greater than −20° C., preferably greater than 0° C., and the carrier has at least one layer which consists of a polyurethane having an elongation at break of at least 100% and a resilience of over 50%.

According to a first advantageous embodiment of the invention, the carrier is provided with an adhesive composition layer on both sides, wherein the second adhesive composition layer is preferably likewise based on vinyl aromatic block copolymers and adhesive resins. Further preferably, the first and second adhesive composition layers have identical compositions.

Preference is given to an embodiment of the adhesive film strip in which the carrier consists of only a single layer.

A particularly advantageous adhesive film strip consists of
- a single-layer carrier of a polyurethane, wherein the carrier has an elongation at break of at least 100% and a resilience of over 50%, wherein
- there is applied to the carrier on both sides an adhesive composition layer comprising an adhesive composition based on vinyl aromatic block copolymers and adhesive resins, wherein further preferably the composition of the adhesive compositions is identical.

In order that correspondingly known strippable adhesive film strips can be detached again easily and without leaving a residue, they must have specific adhesion-related properties:

The adhesiveness of the adhesive film strips must fall significantly upon stretching. The lower the adhesive power in the stretched state, the less the substrate is damaged upon detachment.

This property is particularly apparent in the case of adhesive compositions based on vinyl aromatic block copolymers in which the adhesiveness falls to less than 10% close to the elastic limit.

In order that strippable adhesive tapes can be detached again easily and without leaving a residue, they must also have some specific mechanical properties in addition to the adhesion-related properties described above.

The ratio of the tensile strength and the stripping force is particularly advantageously greater than two, preferably greater than three.

The stripping force is the force which must be applied in order to detach an adhesive strip from a joint by parallel pulling in the direction of the adhesion plane. The stripping force is composed of the force which, as described above, is necessary to detach the adhesive strip from the substrates and the force which must be applied to deform the adhesive strip. The force required to deform the adhesive strip is dependent on the thickness of the adhesive film strip.

The force required for detachment, on the other hand, is independent of the thickness of the adhesive strips in the thickness range of the adhesive film strip under consideration (50 µm to 800 µm).

The tensile capacity, on the other hand, increases proportionally to the thickness of the adhesive strips. Consequently, for self-adhesive tapes having a single-layer structure, as are disclosed in DE 33 31 016 C2, the tensile strength below a specific thickness is less than the pull-off force. Above a specific thickness, on the other hand, the ratio of the pull-off force to the stripping force is greater than two.

There are preferably used as pressure-sensitive adhesive compositions those based on block copolymers comprising polymer blocks formed predominantly of vinyl aromatic compounds (A blocks), preferably styrene, and those formed predominantly by polymerization of 1,3-dienes (B blocks), such as, for example, butadiene and isoprene, or a copolymer of the two. The products can thereby also be partially or completely hydrogenated in the diene block. Block copolymers of vinyl aromatic compounds and isobutylene can likewise be used according to the invention.

The block copolymers of the pressure-sensitive adhesive compositions preferably have polystyrene end blocks.

The block copolymers resulting from the A and B blocks can comprise identical or different B blocks. The block copolymers can have linear A-B-A structures. Block copolymers of radial form as well as star-shaped and linear multi-block copolymers can likewise be used. A-B two-block copolymers can be present as further components. All of the above-mentioned polymers can be used on their own or in a mixture with one another.

Instead of the preferred polystyrene blocks, there can also be used as vinyl aromatic compounds polymer blocks based on other homo- and copolymers comprising aromatic compounds (preferably $C_8$- to $C_{12}$-aromatic compounds) having glass transition temperatures of greater than 75° C., such as, for example, aromatic blocks comprising α-methylstyrene. Identical or different A blocks can further be present.

Within the context of this invention, A blocks are also referred to as "hard blocks". B blocks are correspondingly also called "soft blocks" or "elastomer blocks". This reflects the selection according to the invention of the blocks according to their glass transition temperatures (at least 25° C., in particular at least 50° C., for A blocks and not more than 25° C., in particular not more than −25° C., for B blocks).

In an advantageous embodiment, the block copolymers have a content of polyvinyl aromatic compounds of from 10 wt. % to 35 wt. %, preferably from 20 wt. % to 32 wt. %.

In a further preferred embodiment, the total amount of vinyl aromatic block copolymers, in particular styrene block copolymers, based on the total pressure-sensitive adhesive composition, is at least 20 wt. %, preferably at least 30 wt. %, more preferably at least 35 wt. %.

Too small an amount of vinyl aromatic block copolymers has the result that the cohesion of the pressure-sensitive adhesive composition is relatively low.

The maximum total amount of vinyl aromatic block copolymers, in particular styrene block copolymers, based on the total pressure-sensitive adhesive composition, is not more than 80 wt. %, preferably not more than 65 wt. %, most particularly preferably not more than 60 wt. %.

Too large an amount of vinyl aromatic block copolymers in turn has the result that the pressure-sensitive adhesive composition is scarcely pressure-sensitively adhesive.

Block copolymers having soft and hard blocks whose glass transition temperatures differ significantly generally form a domain structure at room temperature. This is used to produce cohesion by physical crosslinking of the adhesive composition. The unmodified block copolymers of styrene blocks and diene/butylene/isobutylene/ethylene/propylene blocks are mostly shear stable only up to 85° C. or up to 100° C.; in that temperature range, the hard blocks begin to soften, depending on the composition.

Pressure-sensitive adhesive compositions according to the invention are based on chosen styrene block copolymers. The pressure-sensitive adhesiveness of the polymer mixtures is achieved by addition of adhesive resins which are miscible with the elastomer phase. As further blend components there can be used inter alia anti-ageing agents, processing aids, dyes, optical brighteners, stabilizers, end block reinforcing resins, and optionally further polymers which are preferably of elastomeric nature.

The nature and amount of the blend components can be chosen as required.

The pressure-sensitive adhesive compositions comprise, in addition to the at least one vinyl aromatic block copolymer, at least one adhesive resin for increasing the adhesion in a desired manner. The adhesive resin is to be compatible with the elastomer block of the block copolymers. In the case of product structures according to the invention comprising at least two, in particular three, layers, of which at least one is a carrier layer and at least one is an adhesive layer, it is to be ensured, as already stated at the beginning, that adhesive resins from the adhesive layer(s) substantially do not migrate into the carrier layer. In contrast to the prior art (introduction of barrier layers or purposive incorporation of the same resins into the adhesive layer(s) and carrier layer), the present invention uses the idea of employing in the adhesive layer(s) mainly adhesive resins which are not compatible with the carrier layer and therefore do not tend to migrate into the carrier layer. According to this inventive concept, at least 75% (based on the total amount of resin) of the resin is chosen with a DACP (diacetone alcohol cloud point) of greater than −20° C., preferably greater than 0° C., in order to avoid migration of the resins into the polar carrier layer, namely the PU carrier layer according to the invention. Particularly preferably, at least 75 wt. % (based on the total amount of resin) of the adhesive resins are hydrocarbon resins or terpene resins or a mixture thereof.

It has been found that there can advantageously be used as tackifier for the pressure-sensitive adhesive composition(s) in particular non-polar hydrocarbon resins, for example hydrogenated and non-hydrogenated polymers of dicyclopentadiene, non-hydrogenated, partially, selectively or completely hydrogenated hydrocarbon resins based on $C_5$-, $C_5/C_9$- or $C_9$-monomer streams, polyterpene resins based on α-pinene and/or β-pinene and/or δ-limonene. The above-mentioned adhesive resins can be used both on their own and in a mixture. It is possible to use both resins that are solid at room temperature and liquid resins. Colophony resins, hydrogenated or non-hydrogenated, are present in the adhesive composition up to a maximum amount of 25%, based on the total mass of the resins, so that the adhesive compositions do not become too polar.

As further additives there can typically be used:
plastifying agents such as, for example, plasticizer oils, or low molecular weight liquid polymers, such as, for example, low molecular weight polybutenes
primary antioxidants such as, for example, sterically hindered phenols
secondary antioxidants such as, for example, phosphites or thioethers
process stabilizers such as, for example, C radical acceptors
light stabilizers such as, for example, UV absorbers or sterically hindered amines
processing aids
end block reinforcing resins, and
optionally further polymers of preferably elastomeric nature; elastomers which can correspondingly be used include inter alia those based on pure hydrocarbons, for example unsaturated polydienes such as natural or synthetically produced polyisoprene or polybutadiene, chemically substantially saturated elastomers such as, for example, saturated ethylene-propylene copolymers, α-olefin copolymers, polyisobutylene, butyl rubber, ethylene-propylene rubber, as well as chemically functionalized hydrocarbons such as, for example, halogen-containing, acrylate-containing, allyl- or vinyl-ether-containing polyolefins.

In one embodiment of the present invention, the pressure-sensitive adhesive composition also comprises fillers; examples which may be mentioned, without implying any limitation, are oxides, hydroxides, carbonates, nitrides, halides, carbides or mixed oxide/hydroxide/halide compounds of aluminum, silicon, zirconium, titanium, tin, zinc, iron or alkali (alkaline earth) metals. These are substantially clays, for example aluminium oxides, boehmite, bayerite, gibbsite, diaspore and the like. Layered silicates such as, for example, bentonite, montmorillonite, hydrotalcite, hectorite, kaolinite, boehmite, mica, vermiculite or mixtures thereof are most particularly suitable. However, carbon blacks or further modifications of carbon, for example carbon nanotubes, can also be used.

The adhesive compositions can also be dyed with dyes or pigments. The adhesive compositions can be white, black or colored.

The carrier layer consists of polyurethanes which have been rendered highly flexible and extensible by their monomer composition. Both polyester urethanes and polyether urethanes can be used. The carriers must have an elongation at break of at least 100% and a resilience of at least 50%, that is to say the elastic component of the carrier material is greater than the plastic component. The thickness of the carrier layer is in the range of from 10 to 200 μm, preferably from 20 to 100 μm.

The stress at 50% elongation should be less than 20 N/cm, preferably less than 10 N/cm, in order to permit easy detachment without the application of an excessively great force.

For better anchoring of the pressure-sensitive adhesive compositions to the carrier, the carriers can be pretreated by known measures such as corona, plasma or flame. The use of a primer is also possible. Ideally, however, pretreatment can be omitted.

The pressure-sensitive adhesive compositions can be produced both from solution and from the melt. The pressure-sensitive adhesive compositions can be applied to the carrier layer by direct coating or by lamination, in particular hot lamination.

Typical manufactured forms of the pressure-sensitive adhesive strips according to the invention are adhesive tape rolls and adhesive strips, as are obtained, for example, in the form of die-cuts.

Preferably, all the layers substantially have the shape of a cuboid. More preferably, all the layers are bonded together over the entire surface.

A grip region that is not pressure-sensitively adhesive can optionally be provided, starting from which the detachment process can be carried out.

Within the context of this invention, the general expression "adhesive tape" includes all sheet-form structures, such as films or film portions which extend in two dimensions, tapes having an extended length and a limited width, tape portions, die-cuts, labels and the like.

The adhesive film strip preferably has a thickness of from 50 μm to 800 μm, more preferably from 100 μm to 600 μm.

The first and/or second adhesive composition layer preferably has a thickness of from 20 μm to 300 μm, more preferably from 30 μm to 150 μm.

Preference is given to an embodiment of the pressure-sensitive adhesive film strip in which the carrier has a thickness of from 40 to 60 μm, preferably 50 μm, and the identical 50 adhesive composition layers each likewise have a thickness of from 40 to 60 μm, preferably 50 μm.

Particularly advantageous embodiments of the invention will be described in greater detail by means of the figures and examples described below, without wishing to limit the invention unnecessarily.

BRIEF DESCRIPTION OF THE DRAWINGS

In the figures

FIG. 1 shows the pressure-sensitive adhesive film strip according to the invention having three layers 1, 2, 3, which can be detached again without leaving a residue and without causing damage by expansive stretching substantially in the adhesion plane.

The strip consists of a carrier 1, wherein the carrier 1 is in one layer and wherein the carrier layer consists of a polyurethane having an elongation at break of at least 100% and a resilience of over 50%. Outer adhesive composition layers 2, 3 are present on both sides of the carrier.

The protruding end of the carrier layer 1 can serve as a grip tab, but is not necessarily present.

Figure 1:
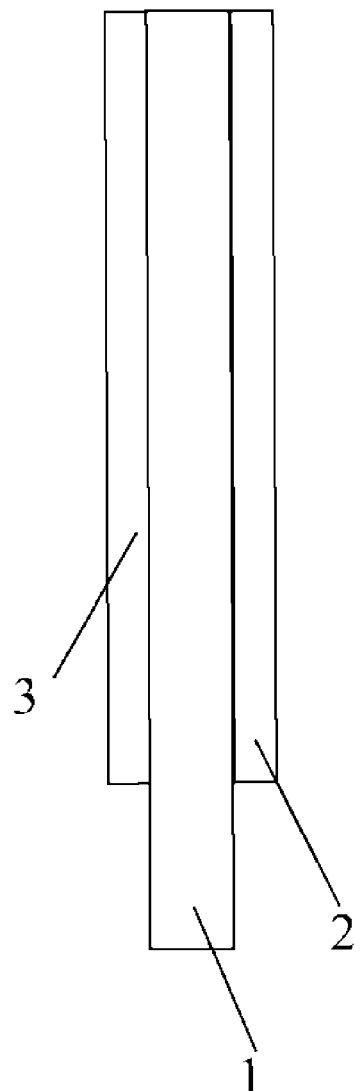
FIG. 1 shows a three-layer pressure-sensitive adhesive strip according to the invention.
Figure 2:
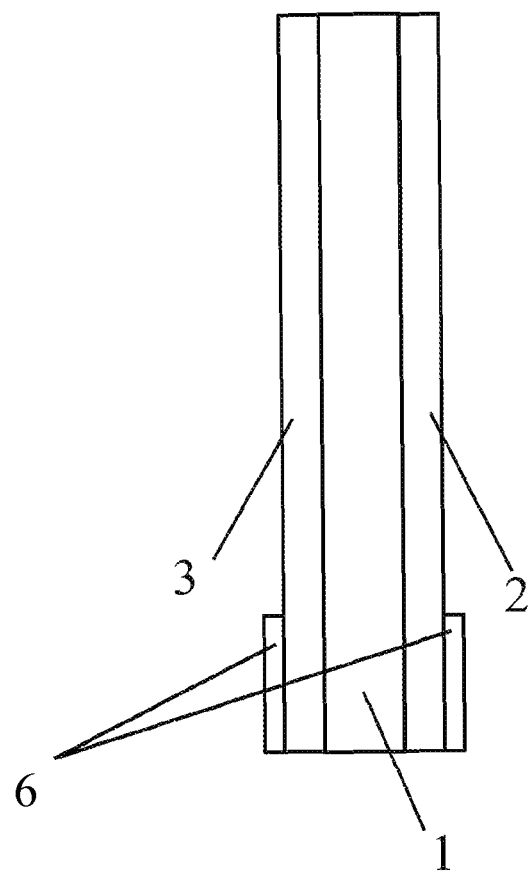
FIG. 2 shows a three-layer pressure-sensitive adhesive strip according to the invention in an alternative embodiment.

FIG. 2 shows a variant of the pressure-sensitive adhesive strip according to the invention. The pressure-sensitive adhesive strip consists of three layers 1, 2, 3 which are arranged congruently one above the other.

In order to produce a grip tab which is pulled in order to achieve expansive stretching in particular in the adhesion plane, pieces of film or paper 6, which are preferably siliconized, are applied to one end of the adhesive film strip so that it is not pressure-sensitively adhesive on both sides.

The invention will be explained in greater detail below by means of examples.

The constituents of the pressure-sensitive adhesive compositions were dissolved 40% in toluene and applied by means of a coating bar to a PET film equipped with a separating silicon so that, after drying at 110° C. for 15 minutes, they had a layer thickness of 50 μm.

The adhesive composition was then laminated onto each side of the carrier layer at room temperature using a rubber roller.

Pressure-sensitive adhesive strips of the desired dimensions were obtained by die cutting.

EXAMPLES

Comparative Example 1

| Single-layer structure (150 μm thickness): | |
| --- | --- |
| 50 parts | Kraton D 1102 |
| 45 parts | Piccolyte A 115 |
| 5 parts | Wingtack 10 |

Example 2

| Multi-layer structure: | |
| --- | --- |
| Carrier layer | |
| 50 μm | Platilon 4100D |
| Outer layers (each 50 μm): | |
| 50 parts | Kraton D 1102 |
| 45 parts | Piccolyte A 115 |
| 5 parts | Wingtack 10 |

Comparative Example 3

| Single-layer structure (150 μm thickness): | |
| --- | --- |
| 25 parts | Vector 4111 |
| 25 parts | Vector 4113 |
| 45 parts | Escorez 1310 |
| 5 parts | Ondina G 17 |

Example 4

| Multi-layer structure: | |
| --- | --- |
| Carrier layer | |
| 50 μm | Platilon U073 |
| Outer layers (each 50 μm): | |
| 25 parts | Vector 4111 |
| 25 parts | Vector 4113 |
| 45 parts | Escorez 1310 |
| 5 parts | Ondina G 17 |

Properties of the Raw Materials Used:

Carrier Layers:
  Platilon 4100D Polyester urethane film from Epurex films having an elongation at break of 450% and a stress at 50% elongation of from 4 to 5 N/cm
  Platilon U073 Polyether urethane film from Epurex films having an elongation at break of 650% and a stress at 50% elongation of from 3 to 4 N/cm Constituents of the Adhesive Composition:
  Kraton D 1102 Styrene-butadiene-styrene block copolymer from Kraton Polymers, 83 wt. % 3-block, 17 wt. % 2-block; block polystyrene content: 30 wt. %
  Vector 4111 Styrene-isoprene-styrene block copolymer from Dexco, 100 wt. % 3-block; block polystyrene content: 18 wt. %
  Vector 4113 Styrene-isoprene-styrene block copolymer from Dexco, 82 wt. % 3-block, 18 wt. % 2-block; block polystyrene content: 15 wt. %
  Piccolyte A 115 α-Pinene resin from Pinova having a softening point by the ring & ball method of 115° C.
  Wingtack 10 Liquid hydrocarbon resin from Cray Valley
  Escorez 1310 Non-hydrogenated hydrocarbon resin from Exxon having a softening point by the ring & ball method of 94° C.
  Ondina G17 Medical white oil from Shell The following mechanical and adhesion-related data were determined for the pressure-sensitive adhesive strips of the examples:

| Pressure-sensitive adhesive composition Example No. | Tensile strength in N/cm | Stripping stress in N/cm | Number of tears in the tear test | Resilience in % |
| --- | --- | --- | --- | --- |
| 1 | 18 | 4 | 6 | 99 |
| 2 | 35 | 6 | 0 | 85 |
| 3 | 12 | 3 | 17 | 97 |
| 4 | 29 | 6 | 1 | 81 |

Comparative examples 1 and 3 show that, with a single-layer structure, the number of tears on stripping at an angle of 30° is higher than in the case of an adhesive strip having a tear-resistant carrier layer.

Nevertheless, the adhesive strips can be detached again with a relatively small force. There is also no splitting of the composite, and the pressure-sensitive adhesive compositions still adhere to the carrier layer even after detachment.

The two samples with a carrier layer did not show any decrease in tack even after 3 months' storage at 40° C.; the tensile strengths were likewise unchanged. This indicates that the adhesive resins have not migrated from the adhesive composition into the carrier layer.

Test Methods

Unless indicated otherwise, all measurements were carried out at 23° C. and 50% relative humidity.

The mechanical and adhesion-related data were determined as follows:

Resilience or Elasticity

In order to measure the resilience, the pressure-sensitive adhesive strips were elongated by 100%, the elongation was maintained for 30 seconds, and then the strips were relaxed. After a waiting time of 1 minute, the length was measured again.

The resilience is calculated as follows:

$$RV=((L_{100}-L_{end})/L_0)*100$$

where RV=resilience in %
$L_{100}$: length of the adhesive strip after elongation by 100%
$L_0$: length of the adhesive strip before elongation
$L_{end}$: length of the adhesive strip after relaxation for 1 minute.

The resilience corresponds to the elasticity.

Elongation at Break, Tensile Strength and Stress at 50% Elongation

The elongation at break, the tensile strength and the stress at 50% elongation were measured in accordance with DIN 53504 using shouldered test bars of size S3 at a rate of separation of 300 mm per minute. The test atmosphere was 23° C. and 50% relative humidity.

Detachment Force

The detachment force (stripping force or stripping stress) was determined with the aid of an adhesive film of dimensions 50 mm length×20 mm width having at the upper end a grip region that is not pressure-sensitively adhesive. The adhesive film was bonded between two steel plates measuring 50 mm×30 mm, which were arranged congruently with one another, with an applied force of in each case 50 Newtons. The steel plates each have a bore at the lower end for receiving an S-shaped steel hook. The lower end of the steel hook carries a further steel plate, via which the test arrangement for measuring can be fixed in the lower clamping jaw of a tensile tester. The bonds are stored for a period of 24 hours at +40° C. After reconditioning to room temperature, the adhesive film strip is detached at a pulling rate of 1000 mm per minute parallel to the adhesion plane and without contact to the edge regions of the two steel plates. The required detachment force is measured in Newtons (N). The mean of the stripping stress values (in N per mm²) is given, measured in the region in which the adhesive strip has become detached from the steel substrates over an adhesion length of from 10 mm to 40 mm.

Susceptibility to Tears

In order to test the susceptibility to tears, 20 adhesive strips measuring 20 mm×50 mm, provided with a grip tab as described in the case of the measurements of the stripping stress, were each adhesively bonded to a glass plate. A polystyrene sheet measuring 40 mm×40 mm was then adhesively bonded to the adhesive strips, the grip tab being allowed to protrude from the joint, and pressed down with a force of 100 N. After a dwell time of 10 days at 40° C., the adhesive strips were detached by pulling, wherein pulling was carried out at an angle of 30°. The number of torn adhesive strips was noted.

Adhesive Resin Softening Temperature

The adhesive resin softening temperature is performed according to the relevant method, which is known as ring & ball and is standardized according to ASTM E28.

DACP

The DACP is the diacetone alcohol cloud point and is determined by cooling a heated solution of 5 g of resin, 5 g of xylene and 5 g of diacetone alcohol to the point at which the solution becomes cloudy.

The invention claimed is:

1. A pressure-sensitive adhesive film strip consisting of:
   a carrier comprising a first side, and a second side, and comprising at least one layer comprising a polyurethane;
   a first, outer adhesive composition layer disposed on the first side; and
   a second, outer adhesive composition layer disposed on the second side, wherein:
   the first, outer adhesive composition layer comprises a first adhesive composition based on at least one first vinyl aromatic block copolymers and at least one first adhesive resin;
   at least 75 wt. % of the at least one first adhesive resin has a diacetone alcohol cloud point of greater than −20° C.;
   the at least one layer comprising a polyurethane has an elongation at break of at least 100% and a resilience of over 50%;
   the first, outer adhesive composition layer, the carrier, and the second, outer adhesive composition layer are arranged congruently with the first, outer adhesive composition layer disposed above the carrier and the carrier disposed above the second, outer adhesive composition layer; and
   the first, outer adhesive composition layer and the second, outer adhesive composition layer have identical compositions;
   wherein if the pressure-sensitive adhesive film strip is adhered to a substrate so that an adhesion plane is formed, the pressure-sensitive adhesive film strip is detachable from the substrate by expansive stretching substantially in the adhesion plane without leaving a residue on the substrate and without causing damage to the substrate.

2. The pressure-sensitive adhesive film strip as claimed in claim 1, wherein the at least one layer consists of a single layer.

3. The pressure-sensitive adhesive film strip as claimed in claim 1, wherein the at least one first vinyl aromatic block copolymers comprises:
   one or more polymer blocks formed predominantly of vinyl aromatic compounds (A blocks); and
   one or more polymer blocks formed predominantly by polymerization of 1,3-dienes (B blocks).

4. The pressure-sensitive adhesive film strip as claimed in claim 1, wherein the at least one first vinyl aromatic block copolymers has a content of polyvinyl aromatic compounds of from 10 wt. % to 35 wt. %.

5. The pressure-sensitive adhesive film strip as claimed in claim 1, wherein the at least one first vinyl aromatic block copolymer comprises one or more polystyrene end blocks.

6. The pressure-sensitive adhesive film strip as claimed in claim 1, wherein the amount of the at least one first vinyl aromatic block copolymer is from 20 to 70 wt. % based on the first, outer adhesive composition layer.

7. The pressure-sensitive adhesive film strip as claimed in claim 1, wherein at least 75 wt. % of the at least one first adhesive resins comprises at least one hydrocarbon resin, at least one terpene resin or a mixture thereof.

8. The pressure-sensitive adhesive film strip as claimed in claim 1, wherein the carrier is from 10 to 200 μm thick.

9. The pressure-sensitive adhesive film strip of claim 1, wherein the at least one first adhesive resin is incompatible with the carrier.

10. The pressure-sensitive adhesive film strip of claim 1, wherein the at least one first adhesive resin does not migrate from the first, outer adhesive composition layer.

11. The pressure-sensitive adhesive film strip of claim 1, wherein the pressure-sensitive adhesive film strip is from 50 to 150 μm thick.

12. The pressure-sensitive adhesive film strip of claim 1, wherein:
the pressure-sensitive adhesive film strip forms a cuboid comprising a top, a bottom, and four sides;
the cuboid further comprises three layers stacked one on top of the other; and
each of the three layers extends to each of the four sides so that each of the four sides has a surface that is flat and even.

13. A method comprising bonding an object to a substrate via the pressure-sensitive adhesive film strip as claimed in claim 1.

14. A combination consisting of:
a first substrate;
a second substrate; and
a pressure-sensitive adhesive film strip as claimed in claim 1,
wherein:
the first, outer adhesive composition layer is bonded to the first substrate forming a first adhesive bond in a first adhesion plane;
the second, outer adhesive composition layer is bonded to the second substrate forming a second adhesive bond in a second adhesion plane;
the first adhesion plane and the second adhesion plane extending parallel to one another; and
the first adhesive bond and the second adhesive bond being releasable by expansive stretching by pulling on the pressure-sensitive adhesive film strip substantially in both the first adhesion plane and the second adhesion plane.

* * * * *